United States Patent
Raghavan et al.

(10) Patent No.: US 10,521,225 B2
(45) Date of Patent: Dec. 31, 2019

(54) MATRIX MULTIPLICATION AT MEMORY BANDWIDTH

(71) Applicant: Oracle International Corporation, Redwood Shores, CA (US)

(72) Inventors: Arun Raghavan, Belmont, CA (US); Sandeep R. Agrawal, San Jose, CA (US); Sam Idicula, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/638,168

(22) Filed: Jun. 29, 2017

(65) Prior Publication Data
US 2019/0004794 A1 Jan. 3, 2019

(51) Int. Cl.
*G06F 17/16* (2006.01)
*G06F 9/30* (2018.01)

(52) U.S. Cl.
CPC ............ *G06F 9/3001* (2013.01); *G06F 17/16* (2013.01)

(58) Field of Classification Search
None
See application file for complete search history.

(56) References Cited

U.S. PATENT DOCUMENTS

| 7,792,895 B1 * | 9/2010 | Juffa | G06F 17/16 708/607 |
| 2007/0271325 A1 * | 11/2007 | Juffa | G06F 17/16 708/607 |
| 2012/0221788 A1 * | 8/2012 | Raghunathan | G06F 17/16 711/114 |
| 2012/0290867 A1 * | 11/2012 | Zhang | G06F 17/16 714/1 |
| 2017/0060811 A1 * | 3/2017 | Yang | G06F 17/16 |

(Continued)

OTHER PUBLICATIONS

Seiler, L et al. Dated Aug. 2008. "Larrabee: A Many-core x86 Architecture for Visual Computing". In ACM Transactions on Graphics (TOG) (vol. 27, No. 3, p. 18). ACM.

(Continued)

*Primary Examiner* — David H Malzahn
(74) *Attorney, Agent, or Firm* — Hickman Palermo Becker Bingham LLP

(57) ABSTRACT

Techniques related to matrix multiplication at memory bandwidth are disclosed. Computing device(s) perform multiplication of a first matrix with a second matrix to generate a third matrix. A first register stores contiguous element values of the first matrix. Furthermore, a second register stores a first set of contiguous element values of the second matrix, and a third register stores a second set of contiguous element values of the second matrix. The first set and the second set correspond to a first row and a second row, respectively, of the second matrix. The first row and the second row are contiguous rows. A single instruction is executed to cause at least a partial computation of contiguous element values of the third matrix. The single instruction causes multiplication of element values stored in the first register with element values stored in the second and third registers and grouped accumulation of the products.

15 Claims, 9 Drawing Sheets

(56) References Cited

U.S. PATENT DOCUMENTS

2019/0004794 A1\* 1/2019 Raghavan ............... G06F 17/16

OTHER PUBLICATIONS

Kurzak et al. dated 2009. "Optimizing Matrix Multiplication for a Short-vector SIMD Architecture-CELL Processor". Parallel Computing, 35(3), pp. 138-150.
Jang et al. "Energy-and Time-efficient Matrix Multiplication on FPGAs." IEEE Transactions on Very Large Scale Integration (VLSI) Systems 13, No. 11 (2005): 1305-1319.
Fatahalian et al. "Understanding the Efficiency of GPU Algorithms for Matrix-Matrix Multiplication". In Proceedings of the ACM SIGGRAPH/EUROGRAPHICS conference on Graphics hardware (pp. 133-137). ACM, 2004.
Coppersmith et al., dated Jan. 1, 1987 "Matrix multiplication via arithmetic progressions", In Proceedings of the nineteenth annual ACM symposium on Theory of computing (pp. 1-6). ACM.
Chen et al., 2014, December. Dadiannao: A Machine-learning Supercomputer. In Proceedings of the 47th Annual IEEE/ACM International Symposium on Microarchitecture (pp. 609-622). IEEE Computer Society.
Piedra, R.M., 1994. "A Parallel Approach for Matrix Multiplication on the tms320c4x dsp". Texas Instruments SPRA107, pp. 1-24.
Kumar, V.P. and Tsai, Y.C., dated 1991. "On synthesizing Optimal Family of Linear Systolic Arrays for Matrix Multiplication". IEEE Transactions on Computers, 40(6), pp. 770-774.
Intel® "Advanced Vector Extensions Programming Reference", dated Jun. 2011, 595 pages.
AltiVec, "Technology Programming Interface Manual. Freescale Semiconductor", dated Jun. 1999, 262 pages.

\* cited by examiner

MATRIX MULTIPLICATION AT MEMORY BANDWIDTH

TECHNICAL FIELD

Embodiments generally relate to data analysis. More specifically, embodiments relate to matrix multiplication at memory bandwidth.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Matrix multiplication is widely used in many practical applications across various industries. For example, in the field of machine learning, matrix multiplication is used for solving systems of linear equations, for batch training of neural networks, etc.

Referring to FIG. 1, first matrix 100 is multiplied with second matrix 102 to derive product matrix 104. For the sake of clarity and ease of explanation, each matrix is depicted as a square matrix. However, the embodiments disclosed herein are not limited to square matrices.

Matrix multiplication typically involves multiplying each row of a matrix with each column of another matrix. For example, elements 106 correspond to the first row of first matrix 100, and elements 108 correspond to the first column of second matrix 102. Values of elements 106 are multiplied with values of elements 108, and the products are accumulated to derive the value of an element having a position in the first row and first column of product matrix 104. In other words, $(1 \times 17)+(2 \times 21)+(3 \times 25)+(4 \times 29)=250$.

Similarly, the values of elements 106 are multiplied with values of elements 110, which correspond to the second column of second matrix 102, and the products are accumulated to derive the value of an element having a position in the first row and second column of product matrix 104. In other words, $(1 \times 18)+(2 \times 22)+(3 \times 26)+(4 \times 30)=260$.

The aforementioned process can be expressed using the following pseudocode:

```
/* A represents a first multiplicand matrix */
/* B represents a second multiplicand matrix */
/* C represents a product matrix */
/* M represents the total number of rows in matrix A */
/* N represents the total number of columns in matrix B */
/* P represents the total number of columns in matrix A */
/* P also represents the total number of rows in matrix B */
/* iterate over each row of A */
for (i = 0; i < M; i = i + 1) {
  /* iterate over each column of B */
  for (j = 0; j < N; j = j + 1) {
    /* iterate over each value in the current row of A and each value
       in the */
    /* current column of B */
    for (k = 0; k < P; k = k + 1) {
      /* compute a particular product matrix element based on
         accumulating */
      /* the product of the current value of A and the current value
         of B */
      C[i][j] += A[i][k] * B[k][j];
    }
  }
}
```

Notably, the pseudocode above involves three loops—an outer loop with two loops successively nested within it. Thus, the pseudocode employs $O(n^3)$ executions of a multiply-accumulate operation, where n is the number of elements in each matrix. As used herein, a multiply-accumulate operation, such as the operation in the innermost loop of the pseudocode above, is an operation that computes the product of two values and adds the product to the value in an accumulator register. Referring to FIG. 1, there are four rows in first matrix 100, there are four columns in second matrix 102, and there are four different combinations of elements for each row-column combination. Thus, there are $4^3$ or 64 executions of the multiply-accumulate operation for computing C[i][j].

Other algorithms with lower complexity bounds exist. For example, Strassen's algorithm has a time complexity of $O(n^{2.8})$. However, other algorithms are not as conducive to parallelization and/or require significant overheads when large matrices are involved.

In addition to the number of computations performed, the running time for matrix multiplication is also dependent on the memory bandwidth achieved when fetching matrix elements from relatively high latency memory, such as dynamic random-access memory (DRAM), into relatively faster memory, such as static random-access memory (SRAM) or register files, that feed the units performing the computations.

To optimize matrix multiplication, computations are typically performed concurrently with memory transfers such that the respective running times for computations and for memory transfers overlap. For example, when multiply-accumulate operations are being performed for one set of element values, another set of element values may be prefetched into a register file. However, since the time complexity of performing the multiply-accumulate operations is greater than the time complexity of performing memory transfers, matrix multiplication optimized in this way is compute-bound.

Some approaches for reducing the latency of performing multiple computations per cycle involve consuming a significant amount of additional power and are thus energy inefficient. Examples include using a fast processor clock and higher voltage, multiple execution units, and/or complex hardware logic to support dynamic and speculative instruction processing.

Some approaches involve achieving parallelism based on replicating units for performing the computations across multiple instances of the same instruction. Non-limiting examples of such an instruction include a single instruction multiple data (SIMD) instruction for a central processing unit (CPU) or a single instruction multiple thread (SIMT) instruction for a graphics processing unit (GPU). However, adding a full vector unit has the drawbacks of requiring a significant amount of additional power, requiring a new Instruction Set Architecture (ISA) to program the vector unit, and requiring additional hardware that occupies a significant amount of additional area.

Some approaches involve configurable hardware platforms, such as field-programmable gate arrays (FPGAs), systolic arrays, or specialized application-specific integrated circuits (ASICs), that are able to extract parallelism much more energy efficiently from hardware. However, such hardware platforms have a programming model that suffers in deployment due to hardness in programming. For example, they would require custom toolchain support for design compilers, synthesis and timing closure, and/or place and route.

Thus, what is needed is an approach that does not suffer from the drawbacks of the aforementioned approaches.

Figure 1:
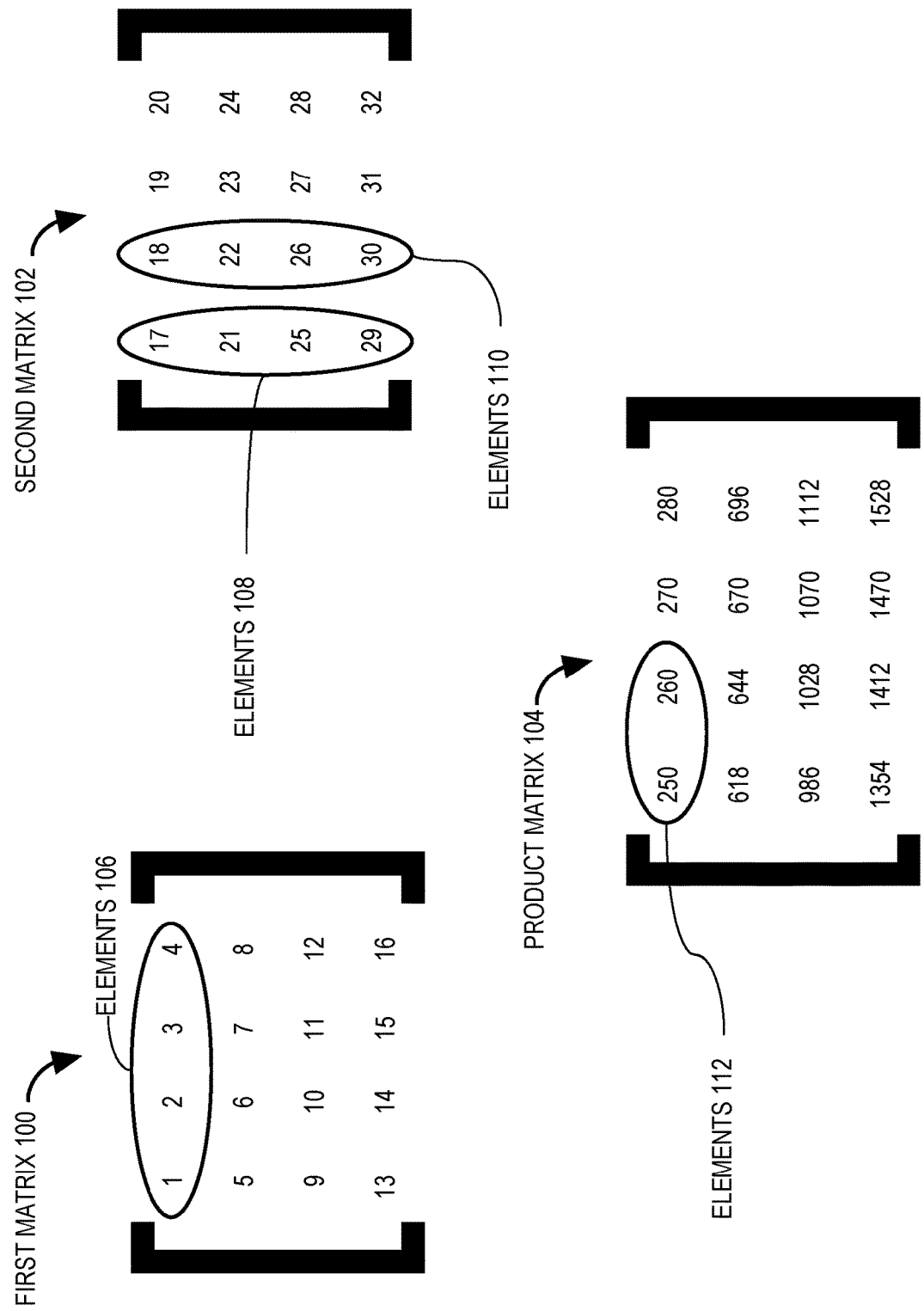
FIG. 1 depicts example matrices.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" are used to differentiate elements and do not necessarily indicate any particular order.

Introduction

The embodiments disclosed herein are related to the performance of matrix multiplication at memory bandwidth. More specifically, a reduction in the time complexity of performing computations is achieved based on reducing the number of iterations involved in performing matrix multiplication. In particular, the number of iterations of the innermost loop is reduced based on adding a single instruction to an existing ISA. The single instruction causes concurrent computation of at least partial values for multiple product matrix elements.

For example, the aforementioned pseudocode may be modified such that the innermost loop causes computation, at least in part, of both C[i][j] and the adjacent C[i][j+1] within a single clock cycle. In some embodiments, the single instruction is a machine code instruction that is converted from assembly language or compiled from a higher-level programming language.

To support the addition of a new instruction to an existing ISA, an existing arithmetic-logic unit (ALU) is modified. More specifically, multipliers and adders are organized such that they are concurrently fed from multiple registers that each store a packed representation of multiple element values.

VMA Instruction

As discussed above, the typical approach for computing product matrix elements takes more time than performing memory transfers. This is at least partly attributable to the fact that the typical approach involves performing computations for one product matrix element at a time. Thus, to achieve a reduction in time complexity, computations for multiple product matrix elements may be performed concurrently. For example, concurrently computing two product matrix elements would halve the time complexity of performing computations. However, concurrently performing computations for multiple product matrix elements requires creating a new instruction—a vector multiply-add instruction or "vma" instruction for short.

Figure 2:
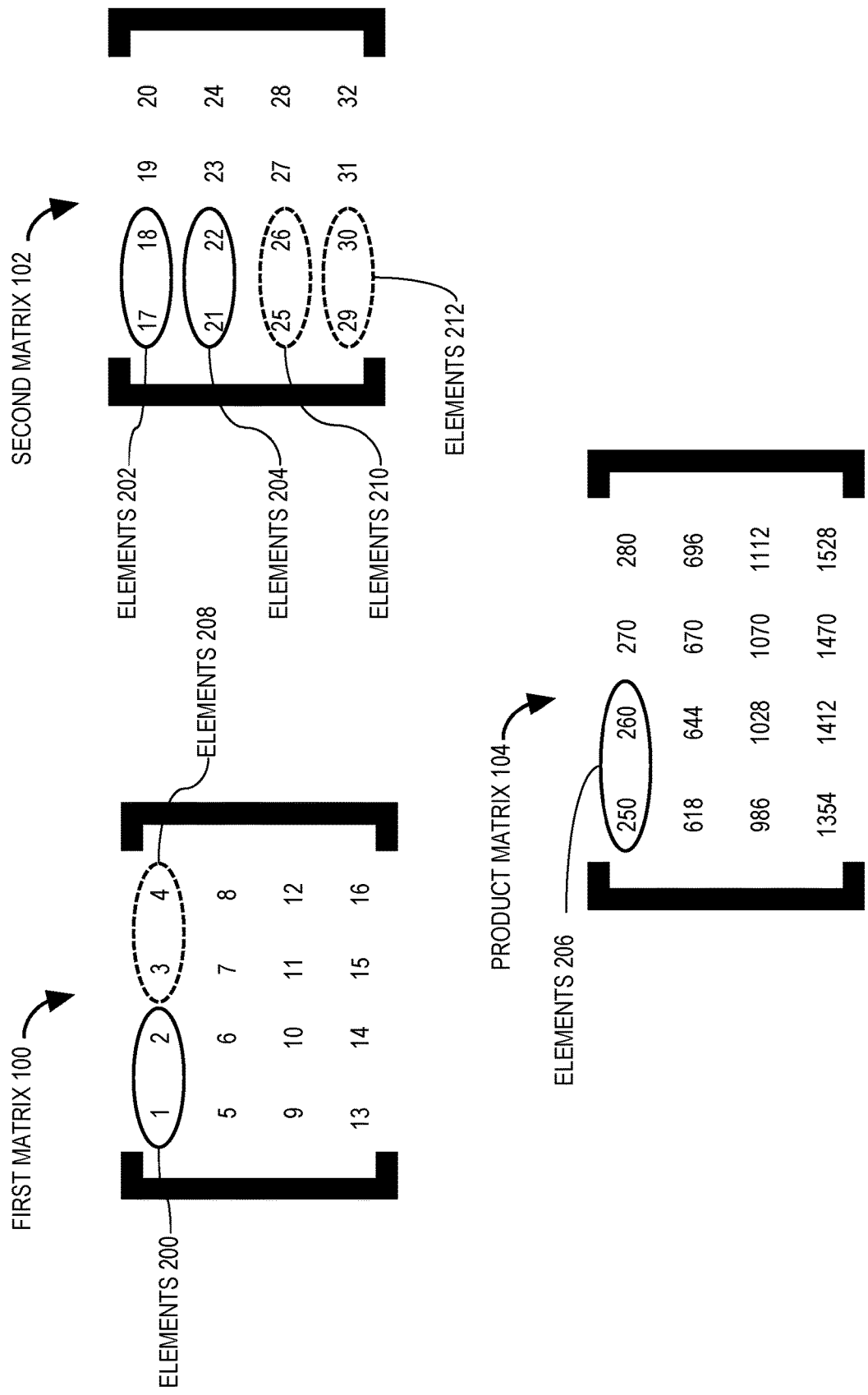
FIG. 2 depicts an approach for matrix multiplication involving tiling.

A vma instruction is a single instruction that causes concurrent computation of at least partial values for multiple product matrix elements that are contiguous. The concurrent computation is implemented using tiles, which can be thought of as submatrices or vectors that each include values corresponding to multiple matrix elements. Referring to FIG. 2, each elliptical shape represents a tile. For example, elements 200 correspond to a tile that includes the element values "1" and "2" of first matrix 100. Although FIG. 2 depicts each tile as corresponding to two matrix elements, each tile may correspond to more than two matrix elements. For example, in some embodiments, each tile may correspond to four matrix elements. As will be described in greater detail below, tile size may be determined by register size.

For tiles corresponding to two matrix elements, the vma instruction causes at least partial computation of two contiguous product matrix elements concurrently. In the example of FIG. 2, the vma instruction causes partial computation of elements 206 based on accumulating the results of multiplying elements 200 with elements 202-204. More specifically, the vma instruction causes the following sets of computations to be performed concurrently:

$$C[i][j] \mathrel{+}= A[i][k]*B[k][j] + A[i][k+1]*B[k+1][j];$$

$$C[i][j+1] \mathrel{+}= A[i][k]*B[k][j+1] + A[i][k+1]*B[k+1][j+1].$$

For the sake of illustration, the values of elements 200-204 are substituted to yield the following equations:

$$59 = (1 \times 17) + (2 \times 21);$$

$$62 = (1 \times 18) + (2 \times 22).$$

A separate execution of the vma instruction causes further computation of elements 206 based on accumulating the results of multiplying elements 208 with elements 210-212. For the sake of illustration, the values of elements 208-212 are substituted to yield the following equations:

$$250 = 59 + (3 \times 25) + (4 \times 29);$$

$$260 = 62 + (3 \times 26) + (4 \times 30).$$

Notably, the vma instruction involves multiple sets of computations, which are represented by the equations above. Each set of computations corresponds to a different product matrix element. Furthermore, each set of computations involves a plurality of multiplications and a plurality of additions. In the example above, each set of computations performs the equivalent of two multiply-accumulate operations. Thus, the vma instruction enables product matrix elements to be computed in fewer iterations than the typical approach.

Provided below is Pseudocode A, which is a non-limiting example of an algorithm using a vma instruction:

```
/* A represents a first multiplicand matrix */
/* B represents a second multiplicand matrix */
/* C represents a product matrix */
/* M represents the total number of rows in matrix A */
/* N represents the total number of columns in matrix B */
/* P represents the total number of columns in matrix A */
/* P also represents the total number of rows in matrix B */
/* iterate over each row of A */
for (i = 0; i < M; i = i + 1) {
  /* iterate over each column set of B */
  for (j = 0; j < N; j = j + 2) {
    /* iterate over each value in the current column set of B and each
    value in the */
    /* current row of A that is to be multiplied to a value in the current
    column set */
    /* of B */
    for (k = 0; k < P; k = k + 2) {
      /* execute a vma instruction */
      C[i][j]   += A[i][k] * B[k][j]   + A[i][k+1] * B[k+1][j];
      C[i][j+1] += A[i][k] * B[k][j+1] + A[i][k+1] * B[k+1][j+1];
    }
  }
}
```

Notably, the number of iterations of the middle loop and the innermost loop has been reduced. Referring to FIG. 2, there are four rows in first matrix 100, there are two column sets in second matrix 102, and there are two different combinations of elements for each row tile-column tile combination. Thus, there are (4×2×2) or 16 executions of the vma instruction. Compared to the 64 executions of the multiply-accumulate operation for C[i][j], the vma instruction enables a speed increase by an order of magnitude. In other words, a reduction in the number of clock cycles from 64 to 16 corresponds to a reduction in computational time complexity from $O(n^3)$ to $O(n^2)$.

A compiler or a programmer using primitives in assembly may ensure that iterations of the middle and innermost loops are performed safely. In particular, the compiler/programmer may be responsible for avoiding overflow of array boundaries and/or unaligned loads. For example, a prologue/epilogue code section may ensure that a loop remains well-aligned and within bounds.

For each set of contiguous elements (e.g., elements 200) of first matrix 100, FIG. 2 depicts two sets of contiguous elements (e.g., elements 202-204) of second matrix 102, wherein each set includes two element values (e.g., 17 & 18). In other words, FIG. 2 depicts a non-limiting example in which second matrix 102 is tiled using a 2×2 submatrix that includes the values 17, 18, 21, and 22. As mentioned above, the simple example of FIG. 2 is provided for clarity and ease of explanation. Thus, the approaches described herein may be implemented using any of a variety of dimensions for the tiling submatrix. For example, a 3×3 submatrix that includes the values 17, 18, 19, 21, 22, 23, 25, 26, and 27 of second matrix 102 may be multiplied with the values 1, 2, and 3 of first matrix 100 to generate the values 250, 260, and 270 of product matrix 104.

System Overview

In some embodiments, a vma instruction is implemented by modifications to an ALU. As will be described in greater detail below, the ALU may be modified in any of a variety of ways to support the vma instruction. In general, the modifications involve organizing multipliers and adders such that they are concurrently fed from multiple registers.

Figure 3:
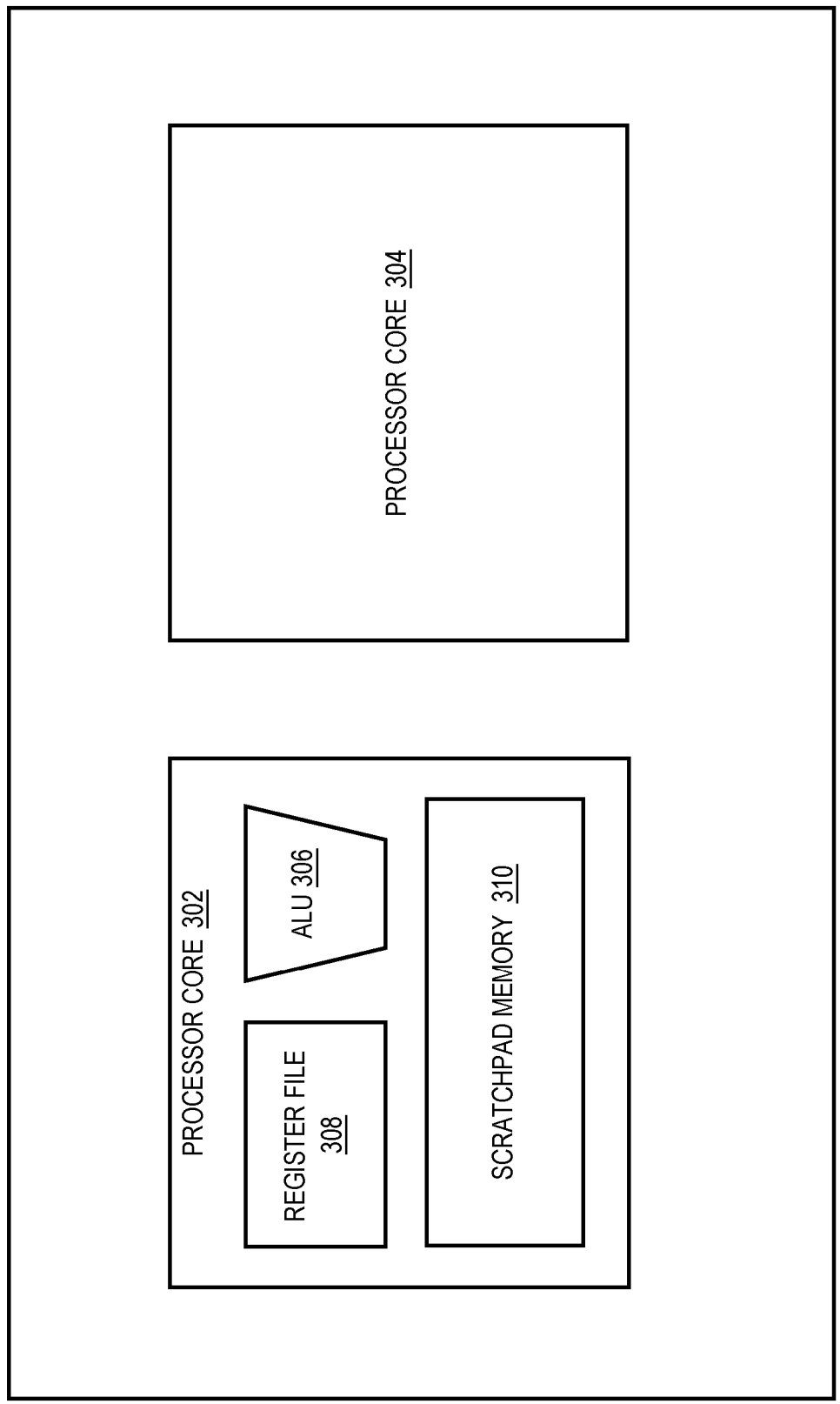
FIG. 3 depicts an example computer architecture upon which embodiments may be implemented.

Referring to FIG. 3, processor core 302 includes ALU 306 and register file 308. Tiles of matrix element values are loaded into registers of register file 308, which feed ALU 306. ALU 306 performs computations with the matrix element values and stores the results in register file 308.

ALU 306 is a digital electronic circuit that performs arithmetic and logic operations. For example, ALU 306 may include circuitry for performing multiplication and addition. In some embodiments, ALU 306 is modified to support a vma instruction based on adding circuitry that enables at least partial computation of two or more product matrix element values with single cycle throughput. For example, ALU 306 may be modified such that, in response to the opcode for a vma instruction, multiplications and additions are concurrently performed on values from four packed registers.

Register file 308 is an array of processor registers in a central processing unit (CPU) or a graphics processing unit (GPU). In some embodiments, register file 308 may be accessed using multiple ports that enable concurrent read and/or write operations. For example, ALU 306 may concurrently read values from four registers and write to one of the four registers.

Each register is packed in that it stores a plurality of matrix element values. For example, if a matrix element value corresponds to 32 bits, then a 64-bit register would be analogous to a vector that stores two matrix element values.

Provided below is Pseudocode B, which converts Pseudocode A into a format involving packed registers and opcode mnemonics, such as "load", "vma", and "store". The conversion may be performed by a compiler pass or a primitive assembler.

```
/* A represents a first multiplicand matrix */
/* B represents a second multiplicand matrix */
/* C represents a product matrix */
/* M represents the total number of rows in matrix A */
/* N represents the total number of columns in matrix B */
/* P represents the total number of columns in matrix A */
/* P also represents the total number of rows in matrix B */
/* rA represents a packed register storing multiple values of A */
/* rB0 represents a packed register storing multiple values corresponding
to a first row of B */
/* rB1 represents a packed register storing multiple values corresponding
to a second row of B */
/* rC represents a packed register storing values corresponding to multiple
elements of C */
/* iterate over each row of A */
for (i = 0; i < M; i = i + 1) {
  /* iterate over each column set of B */
  for (j = 0; j < N; j = j + 2) {
    /* fetch current values of product matrix elements */
    load C[i][j, j+1] -> rC;
    /* iterate over each value in the current column set of B and
    each value in the */
    /* current row of A that is to be multiplied to a value in the
    current column set */
    /* of B */
    for (k = 0; k < P; k = k + 2) {
      /* fetch values of A */
      load A[i][k, k+1] -> rA;
      /* fetch values of first row of B */
      load B[k][j, j+1] -> rB0;
      /* fetch values of second row of B */
      load B[k+1][j, j+1] -> rB1;
      /* execute a vma instruction */
      vma rB0, rB1, rA -> rC;
    }
```

```
/* write updated values of product matrix elements to memory */
   store C[i][j, j+1] <- rC;
  }
}
```

Notably, Pseudocode B causes a set of product matrix element values to be fully computed prior to causing even a partial computation of a different set of product matrix element values. For example, a first execution of a vma instruction may cause partial computation of product matrix element values W and X, a second execution of the vma instruction may cause further partial computation that completes computation of product matrix element values W and X, and a third execution of the vma instruction may cause partial computation of product matrix element values Y and Z. In Pseudocode B, fully computed product matrix element values are then moved from register file 308 to memory, such as scratchpad memory 310 or some other cache.

Scratchpad memory 310 is an example of addressable memory. Addressable memory is memory which can be referenced, such as by referring to a register storing a particular memory address, by an instruction that causes a processor to load data from the particular memory address to a register or to store data from a register to a particular memory address.

Use of scratchpad memory 310 has several advantages. Like a L1 cache, scratchpad memory 310 is positioned close to registers and enables rapid retrieval of small amounts of data that are temporarily stored. For example, scratchpad memory 310 may store temporary results generated mid-computation by a processor. Unlike a L1 cache, however, data stored in scratchpad memory 302 is not always copied into main memory.

Furthermore, scratchpad memory 310 is a particular type of SRAM that can be manually managed. Typical cache management is under the control of hardware. In contrast, management of scratchpad memory 310 may be controlled by a programmer via software instructions that address memory locations in scratchpad memory 310. Thus, scratchpad memory 310 may be preferable to a L1 cache in applications where predictable timing is desirable, such as in real-time applications.

However, in some embodiments, scratchpad memory 310 may be a cache that is made to behave like a conventional scratchpad memory. For example, cache control instructions may be employed to provide a programmer with control over data stored in a L1 cache.

Scratchpad memory 310 is electronically coupled to processor core 302, which may be part of a multi-core CPU and/or GPU that performs matrix multiplication. Referring to FIG. 3, computing device 300 comprises processor cores 302-304. Processor core 304 may have its own ALU, register file, and/or scratchpad memory. In some embodiments, processor core 304 is organized similarly to processor core 302. Although FIG. 3 depicts two cores, embodiments disclosed herein may be implemented using any number of cores.

Each core comprises separate circuitry on the same chip. Thus, each core can separately execute a machine code instruction within the same clock cycle(s) in which another core executes an instruction, thereby achieving parallelization. However, each core has its own scratchpad memory, which is inaccessible to any of the other cores.

For example, in Pseudocode B, before values of first matrix 100 are loaded into a register, each row of first matrix 100 may be distributed to a different core. By doing so, each row of product matrix 104 is also distributed to a different core. Thus, each core performs computations involving a different row of first matrix 100 and stores values for a different row of product matrix 104 in a separate scratchpad memory. The values for each row of product matrix 104 may be moved from scratchpad memory to main memory, where they are combined to form product matrix 104.

Dedicated Registers

Figure 4:
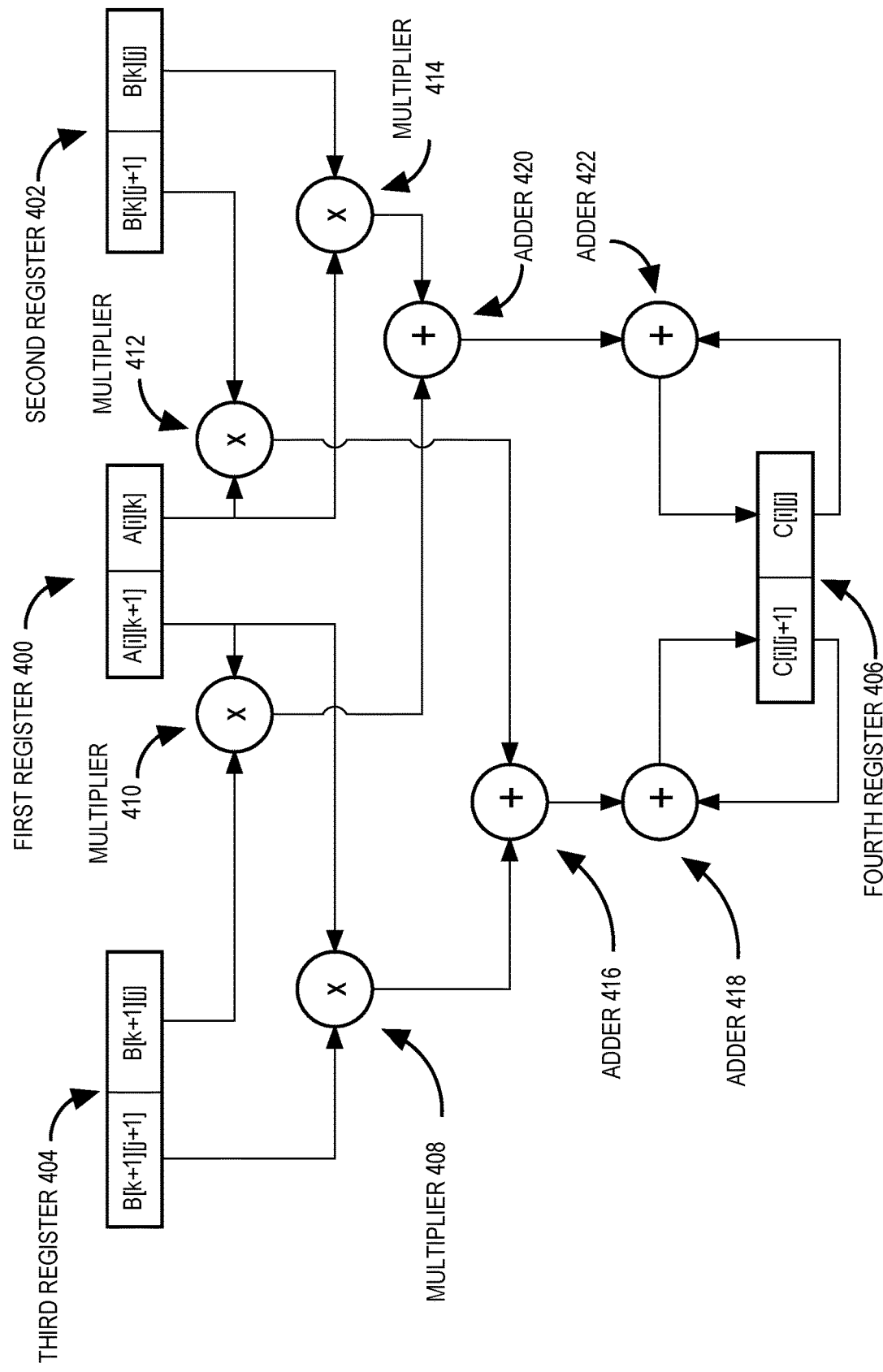
FIG. 4 depicts example modifications to an arithmetic-logic unit involving dedicated registers.

As mentioned above, any of a variety of modifications to ALU 306 may be used to implement a vma instruction. In some embodiments, ALU 306 is modified such that it is concurrently fed from a plurality of dedicated registers. Referring to FIG. 4, ALU 306 is hardwired to include multipliers 408-414 and adders 416-422 that are concurrently fed from registers 400-406 in two sets of parallel wires. Set A includes multipliers 408-410 and adders 416-418, and Set B includes multipliers 412-414 and adders 420-422. Thus, in some embodiments, ALU 306 is modified such that it has more than two input ports.

Each of registers 400-406 is dedicated to storing values corresponding to elements of a particular matrix. In some embodiments, each element is allocated 32 bits of a register. First register 400 is dedicated to storing values corresponding to contiguous elements A[i][k] and A[i][k+1] of first matrix 100. Second register 402 and third register 404 are dedicated to storing element values from contiguous rows of second matrix 102. Second register 402 stores values corresponding to contiguous elements B[k][j] and B[k][j+1], and third register 404 stores values corresponding to contiguous elements B[k+1][j] and B[k+1][j+1]. Fourth register 406 is an accumulator register that is dedicated to storing values corresponding to contiguous elements C[i][j] and C[i][j+1] of product matrix 104.

Notably, FIG. 4 depicts four multipliers 408-414 and four adders 416-422 that can be grouped into sets that each include two multipliers and two adders. Set A supports a vma instruction that causes computation, at least in part, of C[i][j+1] based on A[i][k+1] and the values in third register 404. On the other hand, Set B supports a vma instruction that causes computation, at least in part, of C[i][j] based on A[i][k] and the values in second register 402.

Each of adders 416-422 is a digital electronic circuit that performs addition. Each of adders 416-422 may comprise a plurality of gates, such as an AND gate, an OR gate, and/or an exclusive OR (XOR) gate.

Each of multipliers 408-414 is a digital electronic circuit that performs multiplication. In some embodiments, each of multipliers 408-414 comprises a plurality of adders.

Fully pipelining a network of cores (e.g., a set of cores that communicate with each other) enables a throughput of one vma instruction per clock cycle. For example, a four-stage pipeline includes an instruction fetch (IF) stage, an instruction decode (ID) stage, an execute (EX) stage, and a writeback (WB) stage. As illustrated below, clobber of fourth register 406 may be avoided by reading from and writing to fourth register 406 in separate half cycles, such as in the decode and writeback stages. As used herein, register clobbering refers to unintentionally overwriting a register.

|  | Time 1 | Time 2 | Time 3 | Time 4 | Time 5 |
| --- | --- | --- | --- | --- | --- |
| Instruction 1 | IF | ID | EX | WB |  |
| Instruction 2 |  | IF | ID | EX | WB |

|             | Time 1 | Time 2 | Time 3 | Time 4 | Time 5 |
|-------------|--------|--------|--------|--------|--------|
| Instruction 3 |      |        | IF     | ID     | EX     |
| Instruction 4 |      |        |        | IF     | ID     |
| Instruction 5 |      |        |        |        | IF     |

However, a latency of one cycle per instruction is not necessary to support multi-cycle, fully pipelined operation. At a minimum, clobber of input registers should be avoided, for example, from a subsequent instruction when a previous vma instruction is in flight. Some approaches involve latching the intermediate results of one or more multipliers and/or adders. For example, at each clock pulse, the resulting values from a particular multiplier/adder may be stored in an input register that feeds another multiplier/adder. Other approaches are described below.

Dynamically Allocated Registers

To avoid register clobbering, some approaches involve increasing the number of registers that are available to store values corresponding to matrix elements. A vma instruction may specify which of the available registers are to be used for matrix multiplication. This enables dynamic allocation of registers for storing particular values.

Figure 5:
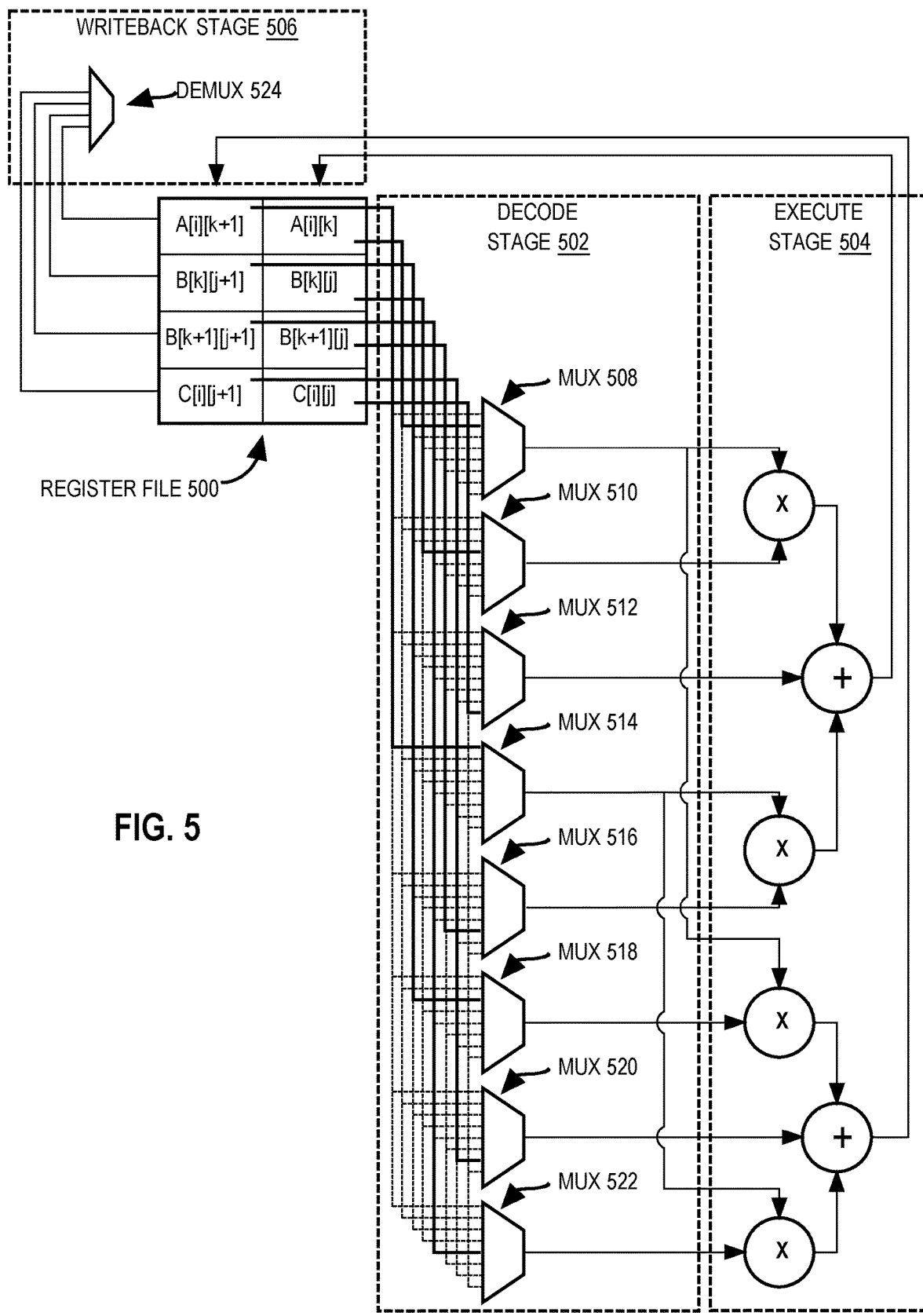
FIG. 5 depicts example modifications to an arithmetic-logic unit involving dynamically allocated registers.

Dynamic allocation of registers may be implemented using a register file with multiple ports. FIG. 5 depicts multiple ports driving values from register file 500 into a customized vma operator tree. Although depicted in FIG. 5 as comprising four registers, in some embodiments, register file 500 comprises more than four registers.

In the fetch stage (not shown), a vma instruction is fetched into an instruction register, and values to be fed to the vma instruction are fetched into register file 500. For example, the values A[i][k] and A[i][k+1] are fetched into a first register; the values B[k][j] and B[k][j+1] are fetched into a second register; the values B[k+1][j] and B[k+1][j+1] are fetched into a third register; and the current values of C[i][j] and C[i][j+1], which may each be zero, are fetched into a fourth register.

In decode stage 502, the vma instruction is decoded to determine which registers store which values for which matrices. For example, the vma instruction may specify which registers correspond to the first register, the second register, the third register, and/or the fourth register. Multiplexers (MUXs) 508-522 are used to select which portion of which register is to provide a particular value to an ALU customized for executing the vma instruction (hereinafter "vma ALU"). As used herein, a MUX is a device that selects one of multiple input lines and forwards data from the selected input line to the device's one output line.

In execute stage 504, the vma ALU executes the vma instruction using the values fed in parallel from MUXs 508-522. For example, the vma ALU is fed values stored in the first register from MUXs 508 and 514, values stored in the second register from MUXs 510 and 518, values stored in the third register from MUXs 516 and 522, and values stored in the fourth register from MUXs 512 and 520.

In writeback stage 506, the output values of the vma ALU are stored in register file 500. Demultiplexer (DEMUX) 524 is used to select which register is to store the output values. As used herein, a DEMUX is a device that selects one of multiple output lines and forwards data from the device's one input line to the selected output line. For example, DEMUX 524 may forward the output values of the vma ALU to a fifth register (not shown) for storage.

Hybrid Approach for Allocating Registers

Figure 6:
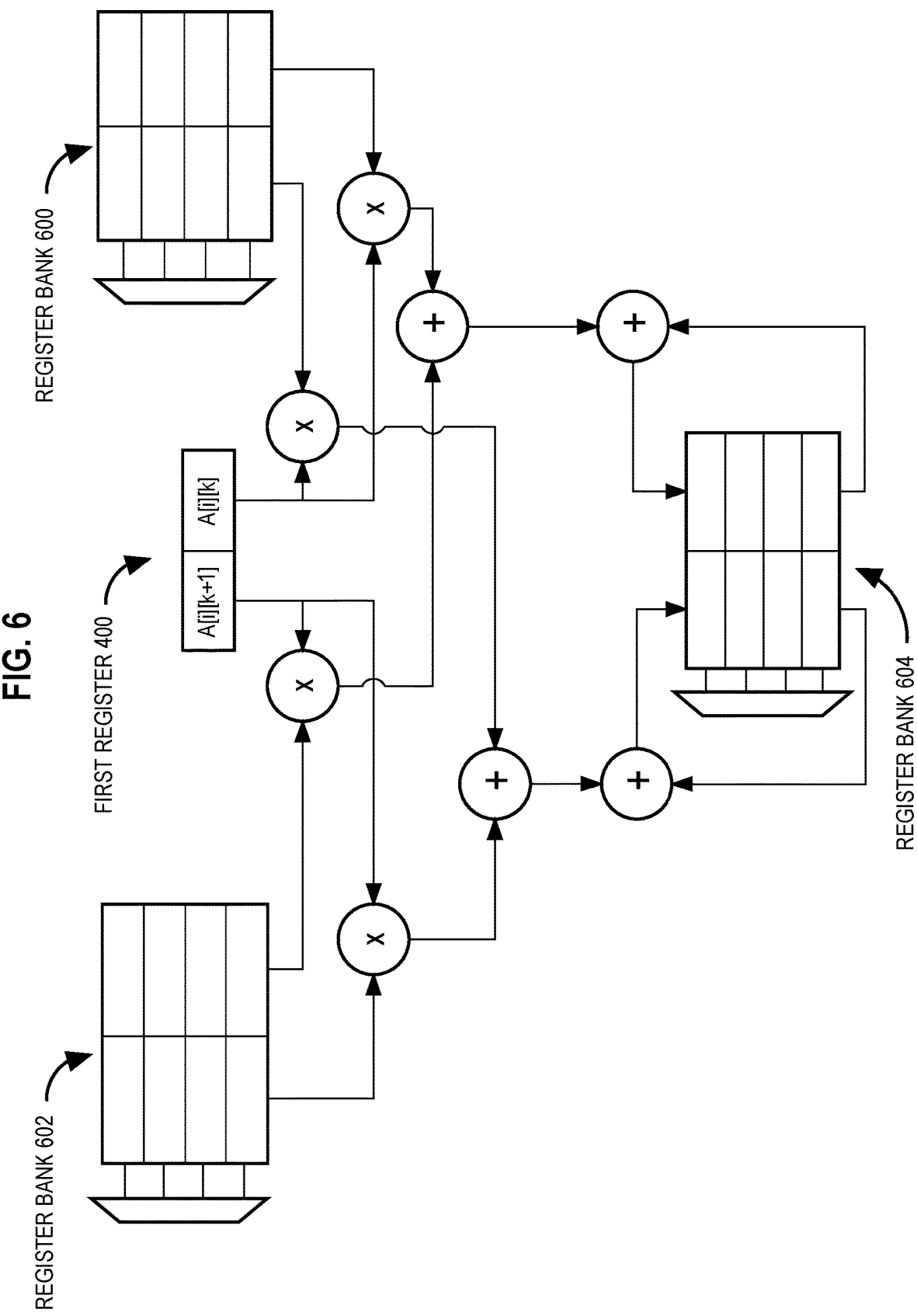
FIG. 6 depicts example modifications to an arithmetic-logic unit involving some dedicated registers and some dynamically allocated registers.

FIG. 6 depicts an example implementation that is a hybrid of FIGS. 4-5. Referring to FIG. 6, first register 400 is a register dedicated to storing element values of first matrix 100, and register banks 600-604 include dynamically allocated registers. Register bank 600 is dedicated to storing element values from a first row of second matrix 102, register bank 602 is dedicated to storing element values from a second row of second matrix 102, and register bank 604 is dedicated to storing values corresponding to elements of product matrix 104.

As used herein, a register bank refers to a group of registers that are accessible by the same port. For example, each of register banks 600-604 may include four registers that are each accessible by the same MUX. Thus, a single register file may include the thirteen registers of first register 400 and register banks 600-604.

Typically, a single register file has a single read port that can access each register of a register file. This means that only one register of the register file may be read at a time. However, parallelism is achieved based on accessing a register file via multiple ports, but adding additional ports that can access each register of a register file involves a significant amount of additional area. For example, FIG. 5 depicts a significant amount of additional wiring for connecting MUXs 510-522 to each register of register file 500.

To enable parallelism in a space-efficient manner, an additional port may be added to only a portion of the register file that is organized into a register bank. For example, register bank 600 may include a port that only accesses registers 2-5, register bank 602 may include a port that only accesses registers 6-9, and register bank 604 may include a port that only accesses registers 10-13. Thus, four read ports may access a register file without even doubling the amount of wiring.

The example implementation of FIG. 6 is identical to the example implementation of FIG. 4 except that registers 402-406 may be dynamically allocated from banks 600-604. In the decode stage, second register 402 is selected from bank 600, third register 404 is selected from bank 602, and fourth register 406 is selected from bank 604.

In some embodiments, software may be optimized for use with the simplified hardware configuration of FIG. 6. Provided below is Pseudocode C, which enables reuse of the values stored in first register 400 based on rearranging parts of the middle and innermost loops.

```
/* A represents a first multiplicand matrix */
/* B represents a second multiplicand matrix */
/* C represents a product matrix */
/* M represents the total number of rows in matrix A */
/* N represents the total number of columns in matrix B */
/* P represents the total number of columns in matrix A */
/* P also represents the total number of rows in matrix B */
/* rA represents a packed register storing multiple values of A */
/* rB0 represents a packed register storing multiple values corresponding
to a first row of B */
/* rB1 represents a packed register storing multiple values corresponding
to a second row of B */
/* rC represents a packed register storing values corresponding to multiple
elements of C */
/* iterate over each row of A */
```

-continued

```
for (i = 0; i < M; i = i + 1) {
  /* iterate over each value in the current row of A that is to be multi-
plied
    to a value in */
  /* the current column set of B */
  for (k = 0; k < P; k = k + 2) {
    /* fetch values of A */
    load A[i][k, k+1] -> rA;
    /* iterate over each column set of B */
    /* current row of A
    for (j = 0; j < N; j = j + 2) {
      /* fetch values of first row of B */
      load B[k][j, j+1] -> rB0;
      /* fetch values of second row of B */
      load B[k+1][j, j+1] -> rB1;
      /* fetch current values of product matrix elements */
      load C[i][j, j+1] -> rC;
      /* execute a vma instruction */
      vma rB0, rB1, rA -> rC;
      /* write updated values of product matrix elements to memory */
      store C[i][j, j+1] <- rC;
    }
  }
}
```

Notably, Pseudocode C may cause partial computation of values for multiple tiles of a product matrix before the values of any of the multiple tiles are completely computed. For example, the first row of product matrix 104 may be computed in the following iterations:

| Iteration 1 of Middle Loop and Iteration 1 of Innermost Loop | | | |
|---|---|---|---|
| 59 | 62 | | |
| Iteration 1 of Middle Loop and Iteration 2 of Innermost Loop | | | |
| 59 | 62 | 65 | 68 |
| Iteration 2 of Middle Loop and Iteration 1 of Innermost Loop | | | |
| 250 | 260 | 65 | 68 |
| Iteration 2 of Middle Loop and Iteration 2 of Innermost Loop | | | |
| 250 | 260 | 270 | 280 |

In other words, a first execution of a vma instruction causes a partial computation of product matrix element values W and X, a second execution of the vma instruction causes a partial computation of product matrix element values Y and Z, and a third execution of the vma instruction causes another partial computation of product matrix element values W and X.

Process Overview

Figure 7:
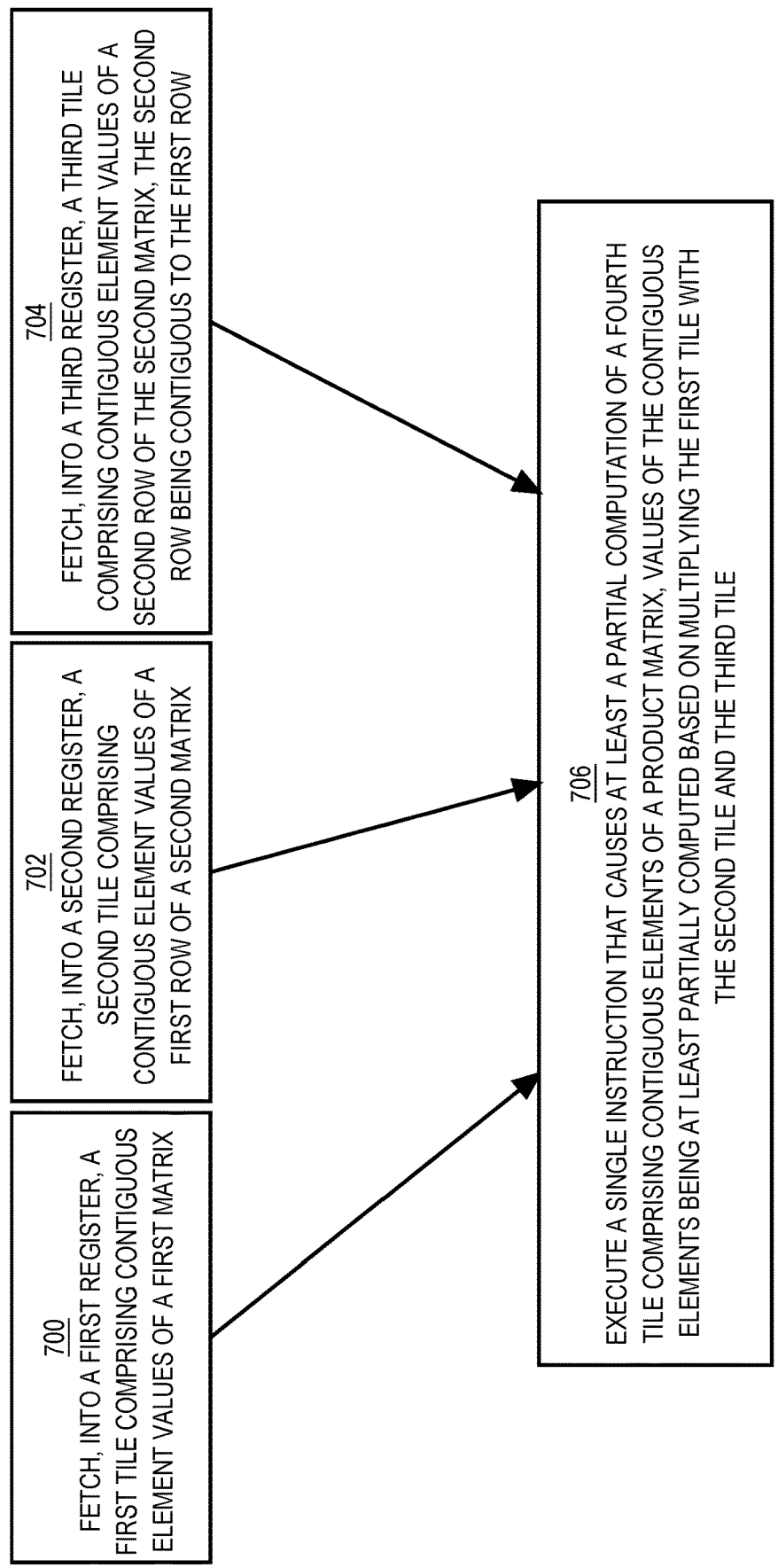
FIG. 7 is a flow diagram that depicts an approach for matrix multiplication at memory bandwidth.

FIG. 7 is a flow diagram that depicts an approach for matrix multiplication at memory bandwidth. One or more computing devices may perform the approach to multiply a first matrix with a second matrix to generate a third matrix. In some embodiments, a core of a multi-core processing unit may perform the approach of FIG. 7.

At block 700, a first tile is stored in a first register. The first tile comprises element values corresponding to contiguous elements of the first matrix. For example, the element values "1" and "2" of first matrix 100 may be loaded into first register 400. The first tile may be fetched from main memory or scratchpad memory. Block 700 may be performed prior to, concurrently with, and/or subsequent to block 702 and/or block 704.

At block 702, a second tile is stored in a second register. The second tile comprises element values corresponding to a first set of contiguous elements of the second matrix. The first set of contiguous elements corresponds to a first row of the second matrix. For example, the element values "17" and "18", which are included in the first row of second matrix 102, may be loaded into second register 402. The second tile may be fetched from main memory or scratchpad memory. Block 702 may be performed prior to, concurrently with, and/or subsequent to block 700 and/or block 704.

At block 704, a third tile is stored in a third register. The third tile comprises element values corresponding to a second set of contiguous elements of the second matrix. The second set of contiguous elements corresponds to a second row of the second matrix. The first row and the second row are contiguous rows of the second matrix. For example, the element values "21" and "22", which are included in the second row of second matrix 102, may be loaded into third register 404. The third tile may be fetched from main memory or scratchpad memory. Block 704 may be performed prior to, concurrently with, and/or subsequent to block 700 and/or block 702.

In some embodiments, prior to blocks 700-704, each row of the first matrix is distributed to a different core of the multi-core processing unit. Accordingly, different cores may compute, in parallel, different rows of the third matrix.

In some embodiments, a fourth tile is stored in a fourth register. The fourth tile comprises any cumulative values, including values of zero, corresponding to a set of contiguous elements of the third matrix. For example, the initial values of "0" and "0" for the first two elements in the first row of product matrix 104 may be loaded into fourth register 406. This may be performed prior to, concurrently with, and/or subsequent to any of blocks 700-704.

At block 706, a single instruction is executed. The single instruction causes at least a partial computation of values corresponding to the elements of the fourth tile. For example, the single instruction may be a vma instruction that concurrently generates, within a single clock cycle, the values "59" and "62", which correspond to the first two elements in the first row of product matrix 104.

More specifically, the single instruction comprises a first set of multiplications and additions and a second set of multiplications and additions. Thus, each set of multiplications and additions corresponds to a different element of the fourth tile. For example, the first set of multiplications and additions may be "0+(1×17)+(2×21)", which corresponds to "59", and the second set of multiplications and additions may be "0+(1×18)+(2×22)", which corresponds to "62".

The multiplications cause addends to be generated based on multiplying the element values stored in the first register with the element values stored in the second register and the element values stored in the third register. In the example above, the addends are enclosed in parentheses. The additions cause two or more sums to be generated based on summing the addends in two or more groups. Each group corresponds to a different element of the fourth tile. In the example above, the two or more sums are the partial values "59" and "62" for the first two elements in the first row of product matrix 104.

Notably, in the example sets of multiplications and additions above, the zero values correspond to the values stored in the fourth register. Thus, the additions further cause two or more cumulative sums to be generated based on accumulating the two or more sums into the fourth register. In the example above, the sums "59" and "62" are accumulated into the fourth register to generate the cumulative sums "59" and "62". Thereafter, the cumulative sums may be moved to main memory and/or scratchpad memory.

In some embodiments, block 706 proceeds to block 700, block 702, and/or block 704 to perform another iteration. A subsequent iteration may either complete computation of element values for the fourth tile or at least partially compute element values for a different tile of the third matrix.

In Example A, to complete computation of element values for the fourth tile, a subsequent iteration may involve fetching, at block 700, the values "3" and "4" into first register 400; fetching, block 702, the values "25" and "26" into second register 402; and fetching, at block 704, the values "29" and "30" into third register 404. Furthermore, the subsequent iteration may involve executing, at block 706, a vma instruction that causes concurrent computation of "59+(3×25)+(4×29)" and "62+(3×26)+(4×30)". Notably, the sums "191" and "198" are added to the values "59" and "62", respectively, to generate the cumulative sums "250" and "260", which are the completely computed first two element values in the first row of product matrix 104. The cumulative sums are stored in fourth register 406 and may subsequently be moved to main memory.

In Example B, a first subsequent iteration may involve fetching, at block 702, the values "19" and "20" into second register 402; and fetching, at block 704, the values "23" and "24" into third register 404. Furthermore, the first subsequent iteration may involve executing, at block 706, a vma instruction that causes concurrent computation of "0+(1× 19)+(2×23)" and "0+(1×20)+(2×24)" to generate the cumulative sums "65" and "68", which correspond to the next two elements in the first row of product matrix 104. The cumulative sums are stored in fourth register 406 and may subsequently be moved to a cache, such as scratchpad memory, to free memory for a second subsequent iteration.

The second subsequent iteration may involve a process similar to that in Example A. However, prior to executing the vma instruction at block 706, the values "59" and "62" are fetched from a cache, such as scratchpad memory, and loaded into fourth register 406.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
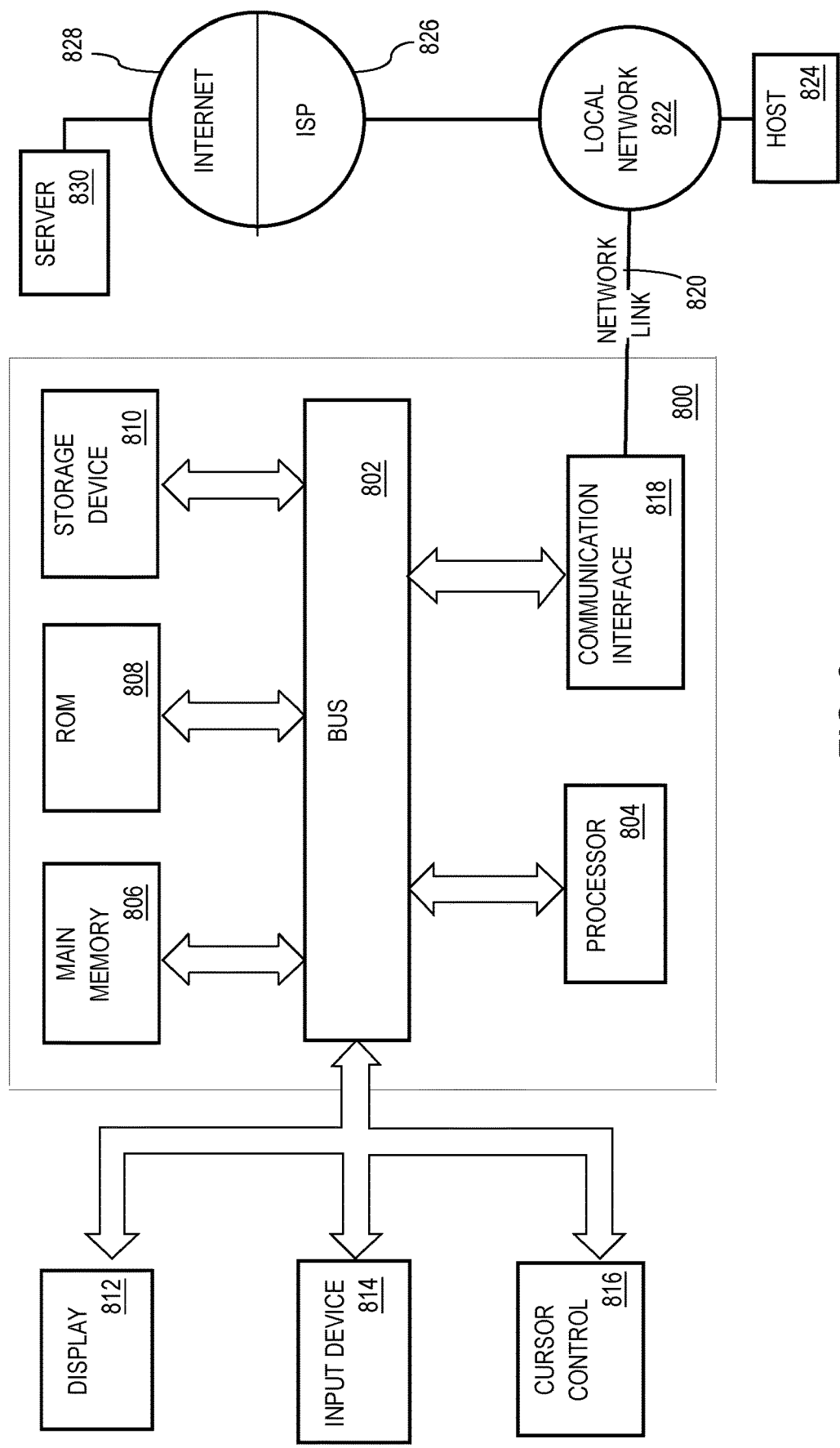
FIG. 8 depicts a computer system upon which embodiments may be implemented.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
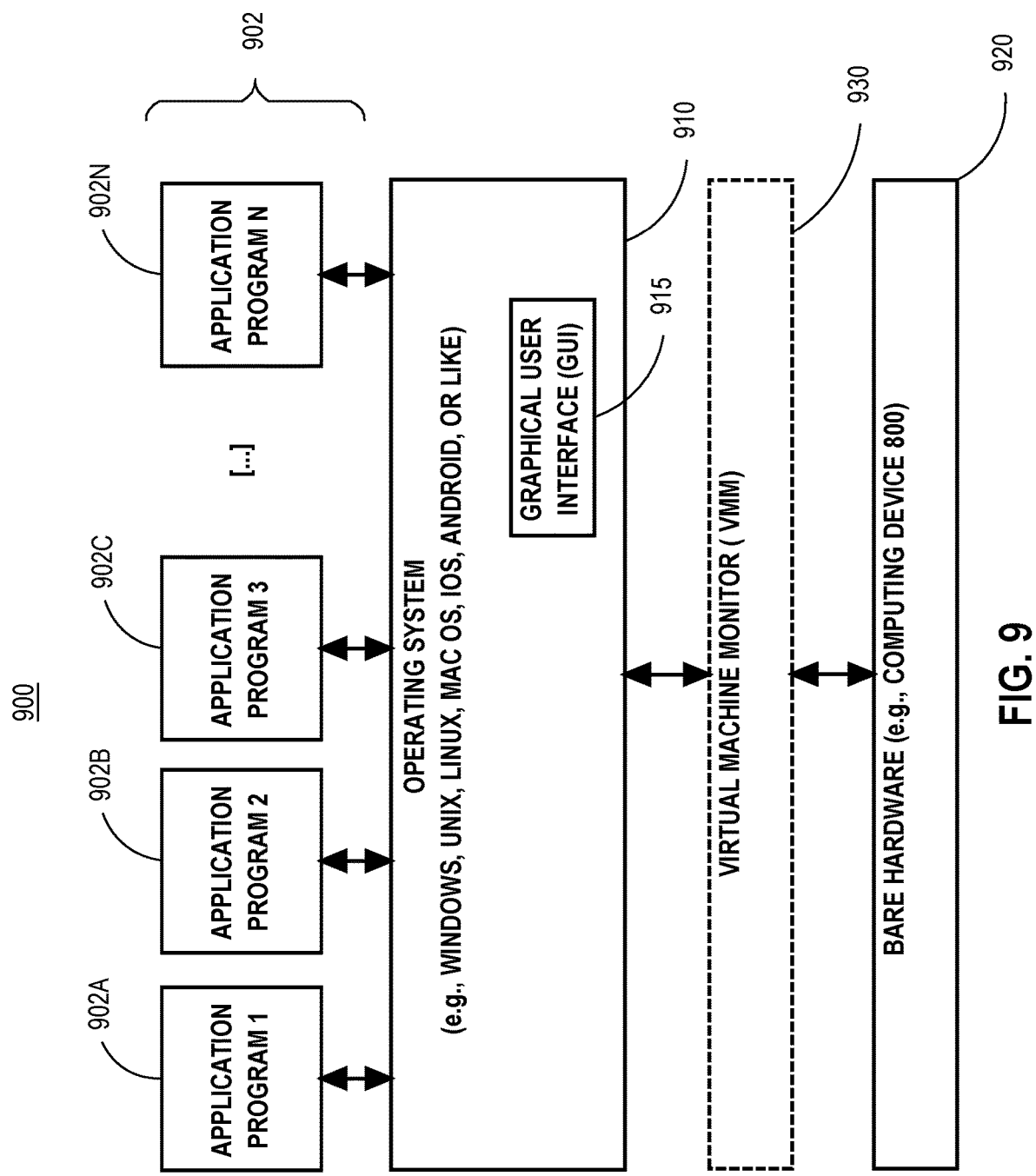
FIG. 9 depicts a software system for controlling the operation of the computer system.

FIG. 9 is a block diagram of a software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 800. The applications or other software intended for use on system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of system 900. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method for multiplying a first matrix with a second matrix to generate a third matrix, the method comprising:
   executing, by a core processor comprising part of electronic circuitry on a single chip, a single instruction that causes a partial computation of element values corresponding to a set of contiguous elements of said third matrix;
   wherein said electronic circuitry on a single chip comprises:
      a plurality of core processors that include said core processor,
      a register file, wherein said register file comprises a first register, a second register, and a third register, and
      a plurality of scratchpad memories that are each connected to a respective core processor of said plurality of core processors, wherein said plurality of scratchpad memories includes a scratchpad memory that is connected to said core processor;
   wherein said partial computation comprises:
      generating addends based on multiplying element values stored in the first register with element values stored in the second register and element values stored in the third register,
      generating two or more sums based on summing said addends in two or more groups, each group of said two or more groups corresponding to a different element of said set of contiguous elements of said third matrix;
   wherein said element values stored in said first register correspond to contiguous elements of said first matrix;
   wherein said elements values stored in said second register correspond to a first set of contiguous elements of said second matrix, said first set corresponding to a first row of said second matrix;
   wherein said element values stored in said third register correspond to a second set of contiguous elements of said second matrix, said second set corresponding to a second row of said second matrix, said first row and said second row being contiguous rows of said second matrix.

2. The method of claim 1, wherein said register file includes a fourth register and wherein executing said single instruction further causes generation of two or more cumulative sums based on adding each sum of said two or more sums to a respective value of two or more values stored in said fourth register, each cumulative sum of said two or more cumulative sums corresponding to a different element of said set of contiguous elements of said third matrix.

3. The method of claim 2, wherein generation of said two or more cumulative sums completes computation of said element values corresponding to said set of contiguous elements of said third matrix.

4. The method of claim 2, further comprising:
   after executing said single instruction, retrieving said two or more cumulative sums from said fourth register and storing said two or more cumulative sums in a cache.

5. The method of claim 4, wherein said cache is a scratchpad memory of the plurality of scratchpad memories.

6. The method of claim 1, wherein said first register is dedicated to storing element values of said first matrix.

7. The method of claim 1, wherein said single instruction specifies which register corresponds to said first register.

8. The method of claim 1, wherein said second register and said third register are included in separate register banks.

9. The method of claim 1, further comprising:
   prior to storing, in said first register, said element values corresponding to said contiguous elements of said first matrix, distributing each row of said first matrix to a different processor core.

10. The method of claim 1, wherein computation of said element values of said set of contiguous elements of said third matrix is completed prior to performing a partial computation of element values of a different set of contiguous elements of said third matrix.

11. Electronic circuitry on a single chip comprising:
   a plurality of core processors;
   a plurality of scratchpad memories;
   a plurality of register files, each register file comprising a first register, a second register, and a third register;
   wherein each core processor of said plurality of core processors is connected to a respective scratchpad memory of said plurality of scratchpad memories and a respective register file of said plurality of register files; and
   wherein each core processor of said plurality of core processors is configured to execute a single instruction for multiplying a first matrix with a second matrix to generate a third matrix, wherein said each core processor is configured to execute the single instruction by performing a partial computation of element values corresponding to a respective set of contiguous elements of said third matrix, said partial computation comprising:
      generating addends based on multiplying element values stored in said first register of the respective register file with element values stored in the second register of the respective register file and element values stored in the third register of the respective register file,
      generating two or more sums based on summing said addends in two or more groups, each group of said two or more groups corresponding to a different element of the respective set of contiguous elements of said third matrix,
   wherein said element values stored in the first register of the respective register file correspond to contiguous elements of said first matrix,
   wherein the elements values stored in the second register of the respective register file correspond to a first set of contiguous elements of said second matrix, said first set of contiguous elements corresponding to a first row of said second matrix, and
   wherein said element values stored in the third register of the respective register file correspond to a second set of contiguous elements of said second matrix, said second set of contiguous elements corresponding to a second row of said second matrix, said first row and said second row being contiguous rows of said second matrix.

12. The electronic circuitry of claim 11, wherein said each register file of said plurality of register files comprises a respective fourth register for each core processor of said plurality of core processors and wherein said each core processor of said plurality of core processors is configured to execute the single instruction by causing generation of two or more cumulative sums based on adding each sum of said two or more sums to a respective value of two or more values stored in the respective fourth register of said each core processor, each cumulative sum of said two or more cumulative sums corresponding to a different element of said set of contiguous elements of said third matrix.

13. The electronic circuitry of claim 11, wherein for each core processor of said plurality of core processors, the first register of the respective register file of said each core processor is dedicated to storing element values of said first matrix.

14. The electronic circuitry of claim 11, wherein said single instruction specifies which register corresponds to the first register of said plurality of register files.

15. The electronic circuitry of claim 11, wherein for each register file of said plurality of register files, the second register of said each register file and the third register of said each register file are included in separate register banks.

\* \* \* \* \*